US010621592B2

(12) United States Patent
Veseli

(10) Patent No.: US 10,621,592 B2
(45) Date of Patent: Apr. 14, 2020

(54) METHODS FOR AUTHENTICATING A PRODUCTS

(71) Applicant: TRUSTED.COM, LLC, Reston, VA (US)

(72) Inventor: Bekim Veseli, Reston, VA (US)

(73) Assignee: TRUSTED.COM, LLC, Reston, VA (US)

( * ) Notice: Subject to any disclaimer, the term of this patent is extended or adjusted under 35 U.S.C. 154(b) by 628 days.

(21) Appl. No.: 14/330,674

(22) Filed: Jul. 14, 2014

(65) Prior Publication Data

US 2015/0012372 A1    Jan. 8, 2015

Related U.S. Application Data

(63) Continuation of application No. 12/632,485, filed on Dec. 7, 2009, now Pat. No. 8,818,874.

(60) Provisional application No. 61/120,546, filed on Dec. 8, 2008.

(51) Int. Cl.
| | | |
|---|---|---|
| G06Q 30/00 | (2012.01) | |
| G06Q 20/20 | (2012.01) | |
| G06Q 30/06 | (2012.01) | |
| G06Q 10/08 | (2012.01) | |
| G06F 21/64 | (2013.01) | |
| H04L 9/32 | (2006.01) | |

(52) U.S. Cl.
CPC ........... *G06Q 30/018* (2013.01); *G06F 21/64* (2013.01); *G06Q 10/087* (2013.01); *G06Q 20/20* (2013.01); *G06Q 20/202* (2013.01); *G06Q 20/203* (2013.01); *G06Q 30/0185* (2013.01); *G06Q 30/06* (2013.01); *G06Q 30/0601* (2013.01); *H04L 9/3226* (2013.01)

(58) Field of Classification Search
CPC ..... G06Q 30/018; G06Q 20/20; G06Q 20/203
USPC ............................................. 705/16, 22, 317
See application file for complete search history.

(56) References Cited

U.S. PATENT DOCUMENTS

| | | |
|---|---|---|
| 6,223,137 B1 | 4/2001 | McCay et al. |
| 6,904,410 B1 | 6/2005 | Weiss et al. |
| 7,222,791 B2 | 5/2007 | Heilper et al. |
| 7,264,169 B2 | 9/2007 | Juds |
| 7,395,963 B2 | 7/2008 | Silverbrook et al. |
| 7,441,712 B2 | 10/2008 | Silverbrook et al. |
| 7,457,961 B2 | 11/2008 | Lapstun et al. |
| 7,461,778 B2 | 12/2008 | Silverbrook et al. |
| 7,464,879 B2 | 12/2008 | Silverbrook et al. |
| 7,467,299 B2 | 12/2008 | Silverbrook et al. |
| 7,467,300 B2 | 12/2008 | Lapstun et al. |
| 7,467,301 B2 | 12/2008 | Silverbrook et al. |

(Continued)

FOREIGN PATENT DOCUMENTS

| | | |
|---|---|---|
| CN | 1588410 | 3/2005 |
| GB | 2 371 643 | 7/2002 |

OTHER PUBLICATIONS

International Search Report issued in PCT/US2009/067026, dated Jan. 15, 2010.

(Continued)

*Primary Examiner* — Florian M Zeender
*Assistant Examiner* — Christopher R Buchanan
(74) *Attorney, Agent, or Firm* — DLA Piper LLP (US)

(57) ABSTRACT

Methods for authenticating a product. Identity data corresponding to a product may be received. The product may be authenticated using the identity data and ownership data.

8 Claims, 2 Drawing Sheets

(56) References Cited

U.S. PATENT DOCUMENTS

| | | | |
|---|---|---|---|
| 7,469,819 B2 | 12/2008 | Silverbrook et al. | |
| 7,472,278 B2 | 12/2008 | Lapstun et al. | |
| 7,484,101 B2 | 1/2009 | Lapstun et al. | |
| 7,506,168 B2 | 3/2009 | Silverbrook et al. | |
| 7,537,157 B2 | 5/2009 | Silverbrook et al. | |
| 7,565,542 B2 | 7/2009 | Silverbrook et al. | |
| 7,637,419 B2 | 12/2009 | Silverbrook et al. | |
| 7,658,325 B2 | 2/2010 | Lapstun et al. | |
| 7,663,789 B2 | 2/2010 | Silverbrook et al. | |
| 7,676,382 B2 | 3/2010 | Silverbrook et al. | |
| 7,677,445 B2 | 3/2010 | Silverbrook et al. | |
| 7,681,800 B2 | 3/2010 | Silverbrook et al. | |
| 7,739,509 B2 | 6/2010 | Silverbrook et al. | |
| 7,784,681 B2 | 8/2010 | Silverbrook et al. | |
| 7,793,854 B2 | 9/2010 | Lapstun et al. | |
| 7,801,742 B2 | 9/2010 | Silverbrook et al. | |
| 7,815,109 B2 | 10/2010 | Silverbrook et al. | |
| 7,854,386 B2 | 12/2010 | Silverbrook et al. | |
| 7,900,819 B2 | 3/2011 | Silverbrook et al. | |
| 7,900,832 B2 | 3/2011 | Lapstun et al. | |
| 7,905,401 B2 | 3/2011 | Silverbrook et al. | |
| 7,913,924 B2 | 3/2011 | Silverbrook et al. | |
| 7,922,075 B2 | 4/2011 | Silverbrook et al. | |
| 7,946,487 B2 | 5/2011 | Silverbrook et al. | |
| 7,962,349 B2 | 6/2011 | Silverbrook et al. | |
| 7,980,467 B2 | 7/2011 | Silverbrook et al. | |
| 8,015,412 B2 | 9/2011 | Lapstun et al. | |
| 8,096,466 B2 | 1/2012 | Silverbrook et al. | |
| 8,111,431 B2 | 2/2012 | Silverbrook et al. | |
| 8,117,455 B2 | 2/2012 | Silverbrook et al. | |
| 8,152,072 B2 | 4/2012 | Silverbrook et al. | |
| 8,285,561 B2 | 10/2012 | Silverbrook et al. | |
| 8,286,222 B2 | 10/2012 | Silverbrook et al. | |
| 8,312,281 B2 | 11/2012 | Silverbrook et al. | |
| 8,403,207 B2 | 3/2013 | Silverbrook et al. | |
| 2002/0152133 A1* | 10/2002 | King | G06Q 10/10 705/317 |
| 2003/0050891 A1 | 3/2003 | Cohen | |
| 2003/0130912 A1 | 7/2003 | Davis, Jr. et al. | |
| 2004/0088231 A1* | 5/2004 | Davis, Jr. | G06Q 10/087 705/28 |
| 2005/0080677 A1 | 4/2005 | Foss, Jr. | |
| 2005/0203856 A1* | 9/2005 | Russell | G06Q 20/20 705/67 |
| 2005/0240496 A1 | 10/2005 | Davis, Jr. et al. | |
| 2005/0258234 A1 | 11/2005 | Silverbrook et al. | |
| 2005/0258235 A1 | 11/2005 | Silverbrook et al. | |
| 2005/0259818 A1 | 11/2005 | Silverbrook et al. | |
| 2005/0261935 A1 | 11/2005 | Silverbrook et al. | |
| 2005/0261936 A1 | 11/2005 | Silverbrook et al. | |
| 2005/0261937 A1 | 11/2005 | Silverbrook et al. | |
| 2005/0261938 A1 | 11/2005 | Silverbrook et al. | |
| 2005/0262348 A1 | 11/2005 | Silverbrook et al. | |
| 2005/0262349 A1 | 11/2005 | Lapstun et al. | |
| 2005/0273597 A1 | 12/2005 | Lapstun et al. | |
| 2005/0273598 A1 | 12/2005 | Silverbrook et al. | |
| 2005/0273615 A1 | 12/2005 | Silverbrook et al. | |
| 2006/0004639 A1 | 1/2006 | O'Keefe | |
| 2006/0022059 A1 | 2/2006 | Juds | |
| 2006/0069654 A1* | 3/2006 | Beach | G06Q 20/367 705/65 |
| 2007/0106897 A1 | 5/2007 | Kulakowski | |
| 2007/0179978 A1 | 8/2007 | Lee et al. | |
| 2008/0005557 A1 | 1/2008 | Chester | |
| 2008/0011847 A1 | 1/2008 | Silverbrook et al. | |
| 2008/0011849 A1 | 1/2008 | Silverbrook et al. | |
| 2008/0011862 A1 | 1/2008 | Silverbrook et al. | |
| 2008/0013124 A1 | 1/2008 | Silverbrook et al. | |
| 2008/0016362 A1 | 1/2008 | Silverbrook et al. | |
| 2008/0016363 A1 | 1/2008 | Lapstun et al. | |
| 2008/0016364 A1 | 1/2008 | Silverbrook et al. | |
| 2008/0017710 A1 | 1/2008 | Silverbrook et al. | |
| 2008/0022112 A1 | 1/2008 | Silverbrook et al. | |
| 2008/0037855 A1 | 2/2008 | Silverbrook et al. | |
| 2008/0050004 A1 | 2/2008 | Silverbrook et al. | |
| 2008/0071421 A1 | 3/2008 | Silverbrook et al. | |
| 2008/0099548 A1 | 5/2008 | Silverbrook et al. | |
| 2008/0101606 A1 | 5/2008 | Silverbrook et al. | |
| 2008/0103984 A1* | 5/2008 | Choe | G06Q 20/20 705/76 |
| 2008/0209511 A1 | 8/2008 | Silverbrook et al. | |
| 2008/0209512 A1 | 8/2008 | Silverbrook et al. | |
| 2008/0237359 A1 | 10/2008 | Silverbrook et al. | |
| 2008/0272186 A1 | 11/2008 | Silverbrook et al. | |
| 2008/0313467 A1 | 12/2008 | Lapstun et al. | |
| 2008/0313706 A1 | 12/2008 | lapstun et al. | |
| 2008/0317280 A1 | 12/2008 | Silverbrook et al. | |
| 2009/0032583 A1 | 2/2009 | Lapstun et al. | |
| 2009/0037739 A1 | 2/2009 | Silverbrook et al. | |
| 2009/0057400 A1 | 3/2009 | Silverbrook et al. | |
| 2009/0077385 A1 | 3/2009 | Silverbrook et al. | |
| 2009/0084859 A1 | 4/2009 | Lapstun et al. | |
| 2009/0091790 A1 | 4/2009 | Silverbrook et al. | |
| 2009/0122352 A1 | 5/2009 | Silverbrook et al. | |
| 2009/0125723 A1 | 5/2009 | Lapstun et al. | |
| 2009/0125724 A1 | 5/2009 | Lapstun et al. | |
| 2009/0132420 A1 | 5/2009 | Silverbrook et al. | |
| 2009/0222285 A1 | 9/2009 | Silverbrook et al. | |
| 2009/0254755 A1 | 10/2009 | Silverbrook et al. | |
| 2010/0001069 A1 | 1/2010 | Silverbrook et al. | |
| 2010/0025478 A1 | 2/2010 | Silverbrook et al. | |
| 2010/0090005 A1 | 4/2010 | Silverbrook et al. | |
| 2010/0135485 A1 | 6/2010 | Lapstun et al. | |
| 2010/0138663 A1 | 6/2010 | Silverbrook et al. | |
| 2010/0145743 A1* | 6/2010 | Colquhoun | G06Q 10/02 705/5 |
| 2010/0147941 A1 | 6/2010 | Silverbrook et al. | |
| 2010/0147942 A1 | 6/2010 | Silverbrook et al. | |
| 2010/0155467 A1 | 6/2010 | Silverbrook et al. | |
| 2010/0235643 A1 | 9/2010 | Silverbrook et al. | |
| 2010/0237145 A1 | 9/2010 | Silverbrook et al. | |
| 2011/0153471 A1 | 6/2011 | Davis, Jr. et al. | |
| 2011/0215145 A1 | 9/2011 | Silverbrook et al. | |
| 2012/0111939 A1 | 5/2012 | Silverbrook et al. | |
| 2013/0024324 A1 | 1/2013 | Davis, Jr. | |
| 2013/0147607 A1 | 6/2013 | Davis, Jr. et al. | |
| 2015/0081475 A1 | 3/2015 | Davis, Jr. | |
| 2015/0317599 A1 | 11/2015 | Davis, Jr. | |

OTHER PUBLICATIONS

Written Opinion issued in PCT/US2009/067026, dated Jan. 15, 2010.

International Preliminary Report on Patentability issued in PCT/US2009/067026, dated Apr. 6, 2011.

Office Action issued in Chinese Application No. 200980150087.8, dated Jun. 3, 2013.

English language translation of Office Action issued in Chinese Application No. 200980150087.8, dated Jun. 3, 2013.

Chinese Office Action issued in CN 200980150087.8 dated Mar. 20, 2014.

English Lanuguage Translation of Chinese Office Action issued in CN 200980150087.8 dated Mar. 20, 2014.

English Language Abstract of CN 1588410 published Mar. 2, 2005.
English language translation of Office Action issued in Chinese Application No. 200980150087.8, dated Mar. 30, 2016.

Office Action issued in Chinese Application No. 200980150087.8, dated Jun. 30, 2015.

English language translation of Office Action issued in Chinese Application No. 200980150087.8, dated Jun. 30, 2015.

English language abstract of CN 101002217 published Jul. 18, 2007.

Office Action issued in Chinese Application No. 200980150087.8, dated Dec. 3, 2014.

English language translation of Office Action issued in Chinese Application No. 200980150087.8, dated Dec. 3, 2014.

European Search Report issues in Application No. 09 83 6685 dated Jul. 10, 2017.

(56) References Cited

OTHER PUBLICATIONS

Office Action issued in Chinese Application No. 200980150087.8, dated Aug. 31, 2016.

* cited by examiner

METHODS FOR AUTHENTICATING A PRODUCTS

CROSS-REFERENCE TO RELATED APPLICATIONS

This application is a continuation of U.S. patent application Ser. No. 12/632,485, filed Dec. 7, 2009, which claims the benefit of U.S. Provisional Patent Application No. 61/120,546, filed on Dec. 8, 2008, the disclosures of which are hereby incorporated by reference in their entireties.

COPYRIGHT NOTIFICATION

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

BACKGROUND OF THE INVENTION

1. Field of the Invention

The present invention relates to a system and method to authenticate products, and more particularly, to a system and method capable of authenticating products from a manufacturer through the chain of commerce up to, including, and beyond a point-of-sale and to maintain a database of the ownership of the products.

2. Description of the Related Art

Counterfeiting branded goods is almost a $1 trillion dollar enterprise annually. The plague of counterfeit goods sold in commerce decreases revenue for the manufacturer of the copied good, or for the athlete or celebrity endorsers of the products sold, etc. The availability of counterfeit products decreases the market value for authentic items since the authenticity of the products is uncertain. Uncertainty about high value products drives down after-market value and limits the resale avenues available to collectors who wish to sell such goods.

The emergence of the Internet as a marketplace has only increased the amount of counterfeit products sold in commerce, and recent court rulings have held Internet sites not responsible for the sale of counterfeit goods. Accordingly, there is a need to provide effective methods to combat counterfeiting, assure buyers that the items they purchased are genuine, and provide assurance to subsequent purchasers that items resold are genuine.

Current solutions to combat counterfeit goods include invisible ink markers, embedded RFID chips, holograms, serial numbers, and certificates of authenticity. However, these approaches all have disadvantages. For example, many of these methods require a unique system of identifying products sold that are themselves eventually counterfeited, and these are not capable of providing independent point-of-sale authentication of products as they are sold.

SUMMARY OF THE INVENTION

The present invention provides a system and method to authenticate a product at a point-of-sale. Further, the present invention provides an authentication platform useful in authentication, product genuineness and title throughout the product's useful life without disrupting manufacturers' current retail practices and processes.

The present invention also provides a platform to track the ownership of a product, and to allow subsequent purchasers of the product to authenticate a purchased product and to update ownership information on the product acquired.

The present invention also provides an open authentication platform capable of using various types of identification data to authenticate the products.

Additional aspects and advantages of the present invention will be set forth in part in the description which follows and, in part, will be obvious from the description, or may be learned by practice of the invention.

The foregoing and/or other aspects and utilities of the present general inventive concept may be achieved by providing a method to authenticate products, the method including registering a product in an authentication platform after manufacture, updating the product's registration in the authentication platform after the product enters commercial distribution, authenticating a product being sold at a point-of-sale, and further updating the product's registration in the authentication platform when the product being sold is certified as authentic.

The registering of the product after manufacture may include collecting identity data corresponding to the product from the manufacturer and inputting the identity data into the authentication platform, and registering the manufacturer as the owner of the product in the authentication platform.

The updating of the product's registration after the product enters commercial distribution may include registering an authorized distributor of the product as the owner of the product in the authentication platform.

The authenticating of the product being sold at the point-of-sale may include comparing identity data of the product being sold to identity data in the authentication platform to determine if the product being sold is authentic.

The product being sold may be certified as authentic when the identity data of the product being sold corresponds to the identity data of the product registered in the authentication platform.

The method may further include issuing a certificate of authenticity at the point-of-sale when the product being sold is certified as authentic.

The certificate of authenticity may include transfer information, and the further updating of the product's registration in the authentication platform when the product being sold is certified as authentic may include registering an authorized purchaser of the product being sold as the owner of the product registered in the authentication platform.

The owner of the product may provide potential buyers access to the product's registration in the authentication platform to confirm ownership of the product.

The owner of the product may provide subsequent owners of the product transfer information, and the method may further include registering a subsequent owner of the product as the owner of the product registered in the authentication platform.

The owner of the product may input status information for the product in the authentication platform, the status information may include at least one of a for sale, not for sale, lost, and stolen status for the product.

The product may be certified as authentic only when the status information of the product is for sale.

The product may not be certified as authentic when the status information of the product is one of not for sale, lost, and stolen.

The foregoing and/or other aspects and utilities of the present general inventive concept may also be achieved by providing a method to authenticate products, the method including storing identity data corresponding to a product in an authentication platform, accessing the authentication platform during an ownership transfer operation for the product, providing identity data for the product during the ownership transfer operation, and determining the authenticity of the product by comparing the product's identity data provided during the ownership transfer operation with the identity data stored in the authentication platform.

The authentication platform may be accessed through a point-of-sale device during the ownership transfer operation, and the ownership transfer operation may include a sale of the product.

The point-of-sale device may issue a certificate of authenticity when the product's identity data provided during the ownership transfer operation corresponds to the identity data stored in the authentication platform.

The method may further include storing ownership information corresponding to the product in the authentication platform.

The method may further include updating the ownership information of the product after the ownership transfer operation.

The certificate of authenticity may include transfer data to allow a purchaser of the product to update the ownership information of the product.

The foregoing and/or other aspects and utilities of the present general inventive concept may also be achieved by providing a system to authenticate retail products, including an authentication platform to register and authenticate products, and a point-of-sale device to access the authentication platform, wherein the authentication platform stores identity data collected from a manufacturer to register the manufacturer as an initial owner of the product in the authentication platform, and the registration of the product may be updated as the product moves through commerce, and wherein the point-of-sale device accesses the authentication platform during a sale operation to authenticate a product being sold by comparing identity data of the product being sold to identity data of the product in the authentication platform to determine if the product being sold is authentic.

The manufacturer may updated the product's registration to register an authorized distributor of the product as the owner of the product in the authentication platform.

The product being sold may be certified as authentic when the identity data of the product being sold corresponds to the identity data of the product registered in the authentication platform.

The point-of-sale device may issue a certificate of authenticity when the product being sold is certified as authentic.

The certificate of authenticity may include transfer information to allow an authorized purchaser of the product being sold to update the registration of the product in the authentication platform to register the authorized purchaser as the owner of the product in the authentication platform.

The owner of the product may provide potential buyers access to the product's registration in the authentication platform to confirm ownership of the product.

The owner of the product may provide subsequent owners of the product transfer information through the authentication platform to register a subsequent owner as the owner of the product in the authentication platform.

The point-of-sale device may be limited to a single retail location.

The point-of-sale device may communicate with the authentication platform through encrypted web service.

The authentication platform may link the product's registration to an online sales or auction website to allow potential buyers to research and verify the product's authenticity before purchasing the product through the online sales or auction website.

The foregoing and/or other aspects and utilities of the present general inventive concept may also be achieved by providing a computer program product stored on tangible computer readable media, the computer program product, when executed by a computer, providing a method to authenticate products, the method including registering a product in an authentication platform after manufacture, updating the product's registration in the authentication platform after the product enters commercial distribution, authenticating a sale of the product at a point-of-sale, and further updating the product's registration in the authentication platform when the product sold at the point-of-sale is certified as authentic.

The authenticating of the sale of the product at the point-of-sale may include comparing identity data of the product sold to identity data in the authentication platform to determine if the product is authentic, and the product sold may be certified as authentic when the identity data of the product sold corresponds to the identity data of the product registered in the authentication platform.

BRIEF DESCRIPTION OF THE DRAWINGS

These and/or other aspects and advantages of the present invention will become apparent and more readily appreciated from the following description of the embodiments, taken in conjunction with the accompanying drawings of which.

DETAILED DESCRIPTION OF THE PREFERRED EMBODIMENT

Figure 1:
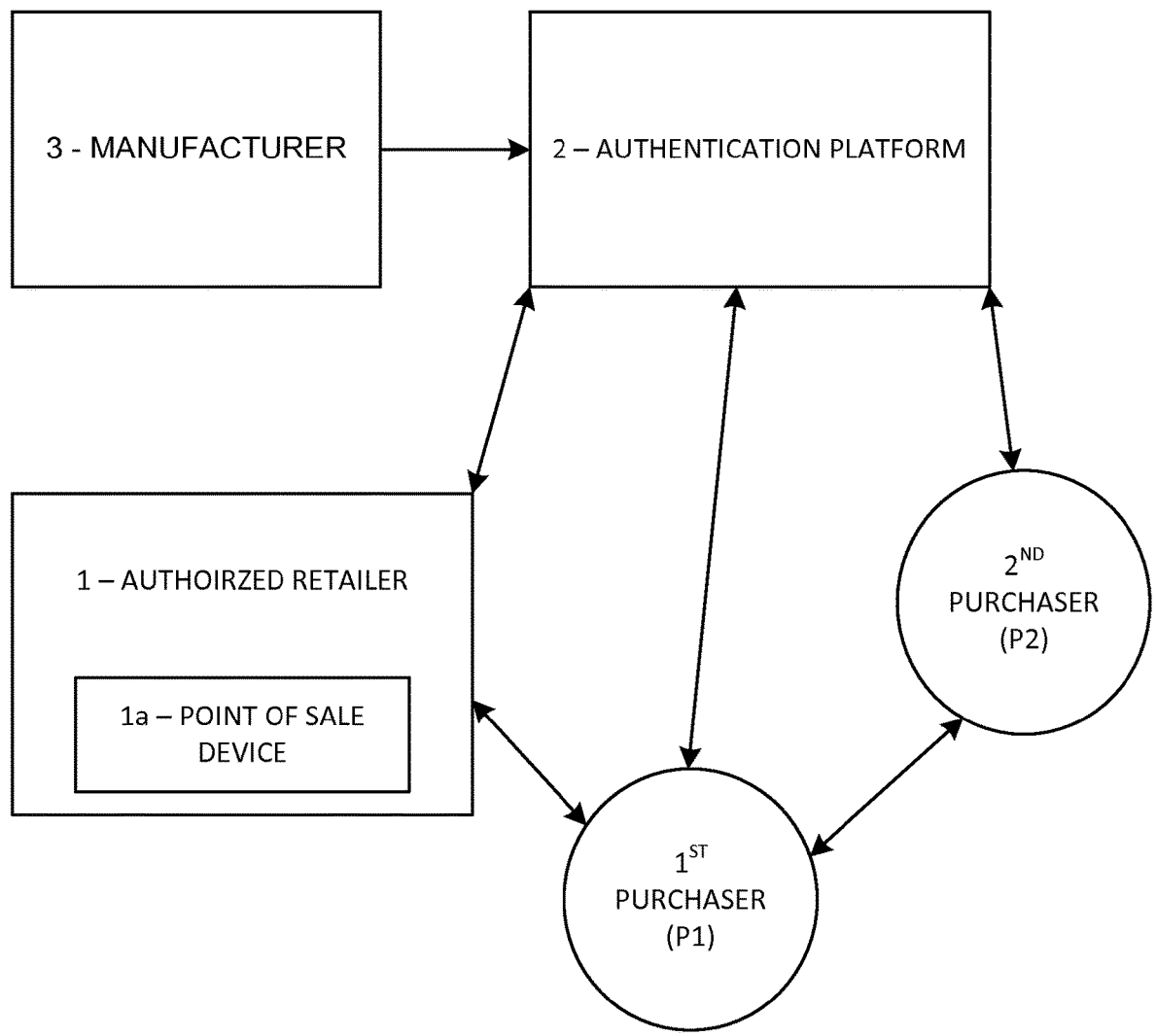
FIG. 1 is a diagram illustrating a system to authenticate a product according to an embodiment of the present invention.

Reference will now be made in detail to embodiments of the present invention, examples of which are illustrated in the accompanying drawings, wherein like reference numerals refer to the like elements throughout. Several of the embodiments are described below in order to explain the present invention by referring to the figures. These embodiments are representative and are in no way intended to limit the potential application of the invention.

FIG. 1 is a diagram illustrating a system to authenticate a product at a point-of-sale. As illustrated in FIG. 1, the system may include an authorized retailer 1, an authentication platform 2, and a manufacturer 3.

The manufacturer 3 provides identification data (ID) for a product to the authentication platform 2, the identification data (ID) can consist of, for example, a serial number associated with the product or any other data or group of data which may be used to uniquely identify a single item. Additional examples of identification data (ID), include but are not limited to 1-dimensional barcodes (1D), 2-dimensional barcodes (2D), Universal Product Code (UPC), Electronic Product Code (EPC), and Item Unique Identification (IUID), all of which can be used to provide identification data (ID) to uniquely identify a product and its associated product information.

The ownership of the product is registered to the manufacturer 3 upon incorporation of the product's identification data (ID) into the authentication platform 2. As the manufacturer 3 introduces the product into the supply chain for distribution, the authentication platform 2 updates the stored identification data to reflect the transfer of ownership and possession of the product to the authorized retailer 1. With the ownership transferred to the authorized retailer 1, the authentication platform 2 updates the product status to reflect the product's availability for sale by the authorized retailer 1.

A first purchaser P1 can purchase the product at the authorized retailer 1. At a time of purchase, the authorized retailer 1 may use a point-of-sale device or website 1a to access the authentication platform 2. The authentication platform 2 compares data corresponding to the product being sold with the stored identification data (ID). The authentication platform 1 may include an electronic database to store information related to the product, for example, the identification data, ownership data, status data, etc. The authentication platform 2 can then supply information regarding the authenticity of the product to the point-of-sale device 1a. For example, the electronic database can be embodied as a centralized component that provides the authentication platform 2 a collection of stored information structured in a way so that it can retrieved, validated, and analyzed, and the information can then be provided to the interacting point-of-sale device and/or website for use by manufacturers, retailers, and individual users. Database management system software can be used for the architecture and functionality of the electronic database and a database server can be used for the electronic storage of the information. A third party can host the electronic database and enforce database security controls such as access controls, encryptions, and auditing in order to protect the stored information.

The point-of-sale device provides an interacting system between the authorized retailer 1 and the authentication platform 2 that allows purchasers a simple and secure method to confirm the authenticity of the product at the time of purchase. The point-of-sale device 1a may include a portable unit to take payment and to access the authentication platform 2. The point-of-sale device 1a can be, for example, an existing pin pad payment device (credit card terminal) at a cash register that has been integrated with the authentication platform 2 through the use of software which provides a multi-solution for payment, verification, and sales registration. The point-of-sale device 2a can be loaded with proprietary software to limit access to the authentication platform to a single retail location with a specific IP address or phone number corresponding to the authorized dealer 1 and/or that particular point-of-sale device 1a. The point-of-sale device 1a can communicate with the database through the use of an encrypted web service that will connect any point of sales terminal with an internet or phone connection to the authentication platform 2, which can be embodied as secured database servers in remote locations.

The authorized retailer 1 can use the point-of-sale device 1a or website to issue a receipt for the sale of the product together with a certificate of genuineness for the product if the product is authenticated. Alternatively, the point-of-sale device 1a can issue a notice that the product sold could not be authenticated.

During the sale of the product, the first purchaser P1 can be registered as the new owner of the product in the authentication platform 2 through the authorized retailer 1 or the authorized retailer 1 can provided transfer information to the first purchaser P1 to allow the first purchaser P1 to register as the new owner with the authentication platform 2. The transfer information can consist of a pin number or other similar information to allow a purchaser to register with the authentication platform 2. For example, a first purchaser P1 can initiate registration at the time of purchase by entering a valid email address and/or other personal information (address, phone, etc.) to create an account with the authentication platform 2 using the point-of-sale device 1a. Alternatively, a first purchaser P1 can also complete a self-registration process and registration of ownership of the product via website access to the authentication platform 2. The website provides the ability to complete transfer of ownership information and register a new user account with a valid email address and/or other personal information (address, phone, etc.). The registration of the user accounts can allow for the identity of the first purchaser P1 to be validated and for the completion of the transfer of ownership of the product from the authorized retailer 1 to the first purchaser P1. The product status can be updated to reflect that the product is no longer available for sale with the completion of the transfer.

The first purchaser P1 can subsequently transfer ownership of the product to a second purchaser P2 in a subsequent after-market sale. For example, P1 can list a product for resale by utilizing a website portion of the authentication platform 2. P1 will be able to link the sale of his/her product on online auction sites, such as EBAY, AMAZON.COM, etc., to the authentication platform 2 to allow potential purchasers to research and verify the product's authenticity before purchasing the product.

The second purchaser P2 can access the authentication platform 2 to authenticate the product. For example, the second purchaser P2 can access a website portion of the authentication platform 2 to enter identity data (ID) for the product. Within the authentication platform 2, the second purchaser P2 can confirm the authenticity of the product, product status as available for resale, and the sellers' ownership of the product.

If the ownership of the product is transferred, P1 can register P2 in the authentication platform 2 or P1 can provide transfer information to P2 such that P2 can itself register with the authentication platform 2. For example, P1 can use the website portion of the authentication platform 2 to update the status of the product to reflect its availability for resale. Once the product status has been updated as available for resale, P1 can complete the transfer ownership form within the authentication platform 2 to processes the ownership transfer to P2. Once ownership has been transferred by P1, P2 can receive email confirmation and then can complete a new user account registration with valid email address and/or other personal information (address, phone, etc.) corresponding to P2 to create an account.

If the first purchaser P1 fails to register with the authentication platform 2 to register an authentic product and then wishes to resell that product, the second purchaser P2 can see a pending confirmation status on the authentication platform 2 when P2 accesses the authentication platform 2 to authenticate the product.

Accordingly, the authentication platform 2 can verify the authenticity of a product sold using the identification data (ID) provided by the manufacturer 3. Additionally, the authentication platform 2 can manage a status of the product. For example, the authentication platform 2 can be accessed to manage a status of the product, for example, to report the product as lost or stolen, transfer ownership of the product, or lock the product against unauthorized sale or transfer.

The identification data (ID) used to authenticate a product can vary according to the manufacturer 3 of the particular product, and the authentication platform 2 can be accessed using different types of identification data (ID) according to the product being authenticated.

Figure 2:
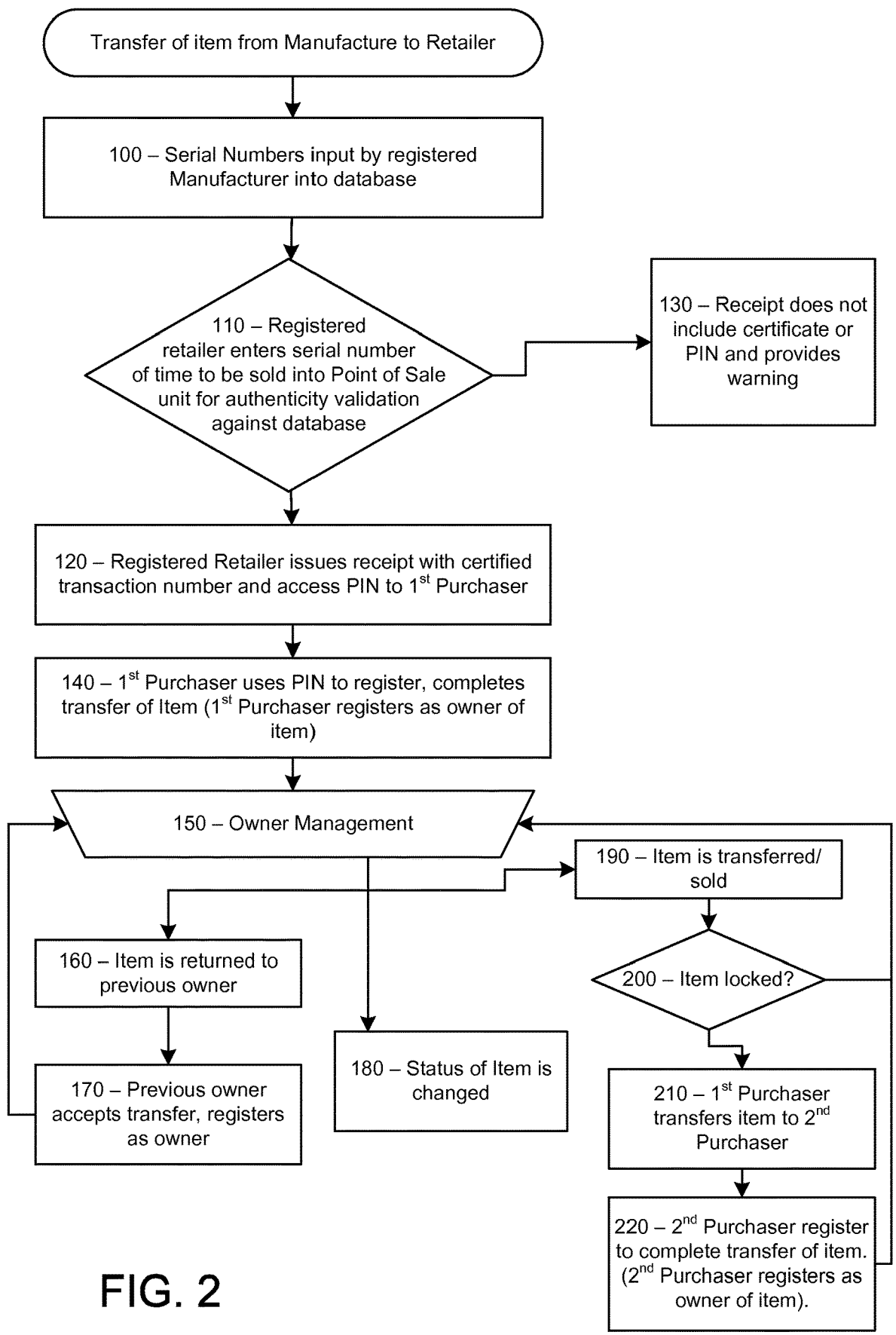
FIG. 2 is a flow chart illustrating a method to authenticate a product according to an embodiment of the present invention.

FIG. 2 is a flow chart illustrating a method to authenticate a product according to an embodiment of the present invention. As illustrated in FIG. 2, identity data for a product is input into a database in operation 100. The identity data may include serial numbers assigned by the manufacturer to the product, and the identity data can be directly input by the manufacturer into the database. In operation 110, an authorized retailer enters identity data for a product being sold into a point-of-sale unit. The point-of-sale unit accesses the database and the authenticity of the product being sold can be verified by comparing the identity data in the database with the identity data input through the point-of-sale unit. The point-of-sale unit can be embodied as a point-of-sale device 1a and/or website as described above.

If the authenticity of the product is validated, the authorized retailer can use the point-of-sale unit to issue a receipt including a certificate of authenticity, in operation 120. Further, the certificate of authenticity can include transfer information, such as a pin number, to allow the purchaser of the product to access the database remotely, for example via the Internet, and register as the current owner of the product, as illustrated in operation 140. If the authenticity of the product cannot be validated, the authorized retailer can issue a receipt which does not include a certificate of authenticity or transfer information, and may also include an indication that the authenticity of the product could not be verified in operation 130.

The current owner of the product can access the database to review and/or manage the ownership of the product, in operation 150. The current owner can be the manufacturer, the authorized retailer, or the registered purchaser of the product, and owner management is available during their time of ownership within the process. For example, an authorized manufacturer has owner management rights at the time of product creation, an authorized retailer has owner management rights at the time of product sale, and an individual has owner management rights at the time of purchase.

Under owner management, the current owner of the product can return ownership of the product to a previous owner in operation 160. In operation 170, a previous owner accepts the transfer of ownership and registers as the current owner of the product. In operation 180, the current owner of the product may change the status of the product. For example, the product may be reported lost or stolen, the product may be "locked" against unauthorized sale or transfer, or the current owner may review the chain of custody/ownership of the product.

"Locking" a product protects a product from unauthorized resale and fraudulent sale of replicas of the product with the same serial number or identification data (ID). It also protects the individual from illegally or unknowingly losing possession of the product. A "locked" product removes the product from potential sales transaction and informs other individuals in the marketplace that the product associated with that identification data (ID) is not available for sale and/or possession. The act of "locking" is accomplished by changing the status of an product to a locked state, where it is not available, for resale. This can done through a web based authentication platform 2. A unique pin can be required to perform this action.

The history of transferred ownership of a product can be maintained in the authentication platform 2 and can be available for review by potential buyers. A potential purchaser, such as P2, will be able to see what user(s) owned the product, where the product was purchased, and the length of ownership. Personally Identifiable Information (PII) can be protected from public view.

In operation 190, the current owner of the product can transfer ownership or sell the product. The status of the product is checked in operation 200 to verify that the product is not locked against unauthorized sale or transfer. Products in a locked state are frozen from sale, resale, or transfer of ownership. A locked product's item details may still available for viewing by other users. However, the web based authentication platform 2 may not allow for any transaction processing or owner management actions to be taken against a locked product other than the ability to change a product to an unlocked state. If the product is unlocked, the current owner transfers ownership of the product to a new owner, such as a second purchaser P2, in operation 210. During the transfer operation, the current owner can provide the new owner with transfer information to register as the new owner and access the database. In operation 220, the new owner registers as the current owner.

The embodiments of the present invention can be written as computer programs and can be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), and storage media such as carrier waves (e.g., transmission through the Internet). Appendix A, incorporated by reference herein, illustrates an example of a web based version of the authentication platform 2, embodied as a web site.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A computerized method to authenticate a product, the method comprising:
   receiving identity data and ownership data corresponding to a product being sold at a point-of-sale device, wherein the point-of-sale device is limited to a single retail location, the identity data comprising information other than or in addition to a radio frequency identification (RFID) tag; and
   authenticating the product being sold using the identity data and the ownership data, the authenticating comprising:
   comparing identity data of the product being sold to identity data in the authentication platform to determine if the product being sold is authentic;
   comparing ownership data of the product being sold to ownership data in the authentication platform to determine if a seller of the product owns the product;
   certifying the product as authentic when the identity data and ownership data of the product sold corresponds to the identity data and ownership data of the product registered in the authentication platform;
   issuing a certificate of authority when the product is certified as authentic;

updating ownership data, the updating comprising indicating the product has a status consisting of: lost or stolen, different ownership, and locked against future transfer;

locking the product to remove it from potential sales transactions and inform potential buyers that the product is not for sale; and linking the product registered in the authentication platform to an online sales or auction website to allow potential buyers to research and verify authentication of the product registered in the authentication platform before purchasing the product through the online sales or auction website.

2. The computerized method of claim 1, where the identity data comprises a serial number associated with the product being sold.

3. The computerized method of claim 1, where the identity data comprises 1-dimensional barcodes (1D).

4. The computerized method of claim 1, where the identify data comprises 2-dimensional barcodes (2D).

5. The computerized method of claim 1, where the identity data comprises Universal Product Code (UPC).

6. The computerized method of claim 1, where the identity data comprises Electronic Product Code (EPC).

7. The computerized method of claim 1, where the identity data comprises Item Unique Identification (IUID).

8. The computerized method of claim 1, where the identity data uniquely identifies the product for sale and its associated product information.

\* \* \* \* \*